(12) United States Patent
Kerkonian (10) Patent No.: US 10,918,983 B2
(45) Date of Patent: Feb. 16, 2021

(54) PNEUMATIC TRAP FOR COLLECTING SUSPENDED PARTICLES DISPERSED IN AIR OR GAS

(71) Applicant: Rafat A. Kerkonian, La Crescenta, CA (US)

(72) Inventor: Rafat A. Kerkonian, La Crescenta, CA (US)

(*) Notice: Subject to any disclaimer, the term of this patent is extended or adjusted under 35 U.S.C. 154(b) by 173 days.

(21) Appl. No.: 16/010,438

(22) Filed: Jun. 16, 2018

(65) Prior Publication Data

US 2019/0381436 A1 Dec. 19, 2019

(51) Int. Cl.
*B01D 45/08* (2006.01)
*B01D 50/00* (2006.01)
*B01D 46/10* (2006.01)

(52) U.S. Cl.
CPC ........... *B01D 45/08* (2013.01); *B01D 46/106* (2013.01); *B01D 50/002* (2013.01)

(58) Field of Classification Search
CPC .... B01D 45/08; B01D 50/002; B01D 46/106; B01D 46/103; B01D 46/0049; B01D 2273/30
USPC ... 55/385.1, 385.5, 473, 485, 417, 356, 418, 55/471, DIG. 46; 454/63, 66, 67, 56, 49, 454/187
See application file for complete search history.

(56) References Cited

U.S. PATENT DOCUMENTS

| | | | | | |
|---|---|---|---|---|---|
| 3,101,110 | A | * | 8/1963 | Vandenberg | B60C 23/18 152/153 |
| 4,134,744 | A | * | 1/1979 | Peterson | B03C 5/026 55/360 |
| 5,352,257 | A | * | 10/1994 | Powers | B01D 45/06 55/444 |
| 5,766,358 | A | * | 6/1998 | Oliver | B60B 7/00 118/504 |
| 6,116,415 | A | * | 9/2000 | Rastelli | B62D 43/005 206/304.1 |
| 9,428,081 | B2 | * | 8/2016 | Riepl | B60N 2/0224 |
| 10,610,817 | B2 | * | 4/2020 | Swan | B01D 46/10 |
| 2009/0235622 | A1 | * | 9/2009 | Stucki | F22B 37/28 55/418 |
| 2016/0263590 | A1 | * | 9/2016 | Whitehead | B03C 1/30 |

* cited by examiner

*Primary Examiner* — Minh Chau T Pham
(74) *Attorney, Agent, or Firm* — D. James Nahikian (57) ABSTRACT

A toroidal trap for capturing stray particles directed inside the hole of the toroid shape and enabling gas to transit internally through and exit from a generally toroidal encasement. A filter is removably attached proximate to the hole and it receives the captured particles, the removability enabling the filter medium to be cleaned or replaced. At least one blower is situated within the encasement to drive air or gas past the filter medium and inside the encasement to exit exterior of the toroidal encasement. A method of using the aforementioned toroidal trap comprising the steps of activating the trap, directing particles at a target through the hole, depositing stray particles onto a filter medium and either repositioning the trap or the target depending on user preference.

5 Claims, 3 Drawing Sheets

PNEUMATIC TRAP FOR COLLECTING SUSPENDED PARTICLES DISPERSED IN AIR OR GAS

FEDERALLY SPONSORED RESEARCH

None.

SEQUENCE LISTING

None.

BACKGROUND OF THE INVENTION

This invention pertains to apparatus and method of capturing stray particles on a filter medium when a particle is directed at a target via a flow of encompassing gas volume. More particularly, the present invention relates to a generally toroidal-shaped means and employment of such means by which particles are directed substantially through the hole of a toroid, with the toroidal shape being positionable proximate to the intended target of a particle, and one or a plurality of blowers internal to the encasement of the toroid creating differential gas pressure and flow enabling the drawing of gas or gasses across or through a filter, preferably removable and gas-permeable, into such encasement with the gas or mixture subsequently exiting such encasement and leaving particles deposited upon or otherwise trapped by the filter's medium.

An application for the invention may be apprehended as means for spraying paint through an aspect of an implement that captures paint which may have ricocheted or otherwise errantly headed toward an area where receipt of paint is not especially desirable. It is readily apparent why an artisan can benefit from focusing on his task of directing paint at a target without bearing the cognitive or practical burden of concern whether some paint particles will deposit on area adjacent the target from which the stray paint should be removed eventually thus involving increased labor activity or registering other negative consequences.

Commonly, a human being, sometimes an artisan receiving the benefit of any doubt in respect of behavior, such as a roadside automobile paint touch-up painter may need to rely upon learned skills which occupy time and costs to develop so the artisan avoids, if he wishes to benefit from delivering his services, inadvertently putting paint where a customer does not want paint. Equipping such an artisan with a tool that enables him to perform his painting tasks for a customer quickly, accurately, effectively and efficiently without relying upon only skill is clearly desirable. Under local conditions such as high winds even an advanced skill set may not avoid errant paint deposits. What has been long desired by industry, therefore, is an invention that generates gas and suspended particle flow which can operate in harmony with local conditions and gravity and other physical influences to enable a roadside automobile paint touch-up painter to spray paint at a vehicle wheel situated inside a tire thereby coating area on the wheel with paint where beneficial and eliminating or reducing paint deposits on the tire or other spaces where no paint is beneficial.

It being commonly understood that the invention long-desired as described here will address the related problems of various industrial requirements and activities beyond roadside automobile paint touch-up such as airliner wheel coating, ship cylinder space terminus coating, bridge cable conduit lining, food processing pipeline valve coating and the other technical and artistic applications whereby the trapping of stray particles is useful. It being further understood the invention novelly manages gas and particle flow as disclosed hereunder.

SUMMARY OF THE INVENTION

The embodiments of the pneumatic trap for collecting suspended particles dispersed in air or gas and the present invention are directed generally to devices and the utilization of such devices for the purpose of reducing or eliminating stray particles from areas physically proximate to a target aimed at when discharging particles in the direction of area on the target's surface. More particularly, this invention relates to a trap for collecting suspended particles dispersed in air or gas with the embodiment having a generally toroidal shape to its encasement with provision for internal space permitting air or gas to flow inside and subsequently exit under pressure in a pre-arranged direction so that the exhaust air or gas, materially purged of undesireable particles that have been captured on a filter medium, does not interfere with the directing of desirable particles at a target proximate to the hole of the toroid. There was an industrial requirement now addressed by various embodiments of the present invention that a filter medium by which stray or otherwise errant particles desired to be segregated and retained in a removable manner so a filter medium is enabled to be cleaned of particles or the filter disposed and replaced to improve effectiveness of operation. Prior to the invention the state of the technology did not develop generally cylindrical, flowing air or gas currents leveraged against a force such as earth's gravity to draw stray particles across or drive particles through a removable filter medium and subsequently exhaust cleansed atmosphere, gas or gases away from a target's direction under pressure. The present invention novelly solves the problems of stray particle capture for both small and large volume particle streaming, spraying or other activities involving the direction of wanted particles at a desired target under physical conditions that allow some particle or a plurality of particles to deposit upon undesired surface area proximate to the target. Moreover the present invention addresses the previously unmet needs of scaling to portability by a single human being in combination with the enabling utilization of an off-grid or otherwise mobile source to power the blower or plurality of blowers that develop gas flow and currents by which dispersed particles are segregated from carrying gas or gasses. An electrical storage battery can serve as a mobile power source, in one embodiment the battery is positioned within the toroidal encasement proximate to the bottom wall of the encasement thus weighting down the encasement and improving stability during usage.

Filter medium harboring electrostatic charge manifests in some embodiments of the invention. The electrostatic charge complements fibrous matrix in one embodiment by attracting oppositely charged particles and trapping them; another embodiment complements spicules in its filter medium by repelling same-charged particles and driving them in a different direction; and, a multi-faceted filter medium encompasses both same-charged and opposite-charged aspects to maneuver stray particles for trapping or redeployment towards a target.

In some embodiments of the present invention, a plurality of electrically-powered fans, wired serial or parallel and immediately powered by DC converted from AC electrical current supplied via a national electrical power grid, comprise the blowers that induct gas within which volume stray particles have been suspended and, as the admixture or suspension is drawn past filter medium, stray particles are deposited or otherwise captured by the filter medium and then gas largely purged of stray particles is received through an intake aperture thereafter flowing through some aspect of the trap's interior space and exiting eventually under pressure from an exhaust aperture. Their toroidal shape generates gas and particle flow unique to a toroid and dynamically useful given the shape's geometrical and mathematical properties, nonetheless, it should be understood that minor departures from a classical or abstract toroid would not materially affect the invention disclosed; for example, the embodiments described in this paragraph may have a flat bottom that enables securing the invention in place under influence of gravity and friction where a mathematically perfect toroidal shape would be unstable during use and even present a rolling hazard on a real world terrain slope. Further, the embodiments discussed in this paragraph incorporate an additional plurality fans of the same type described herein, each such fan for exhausting filtered gas or gasses from separated apertures in directions which do not disturb gas currents proximate to the target. It being generally understood that a baffle or plurality of baffles appear in these embodiments to establish, shape and direct gas flow through the interior space of the generally toroidal encasement.

Accordingly, one or more of the embodiments offer several advantages as follows: providing air or gas currents that shape the flow of sprayed particles such as paint in a beneficial direction and pattern for contacting a target while concurrently directing stray particles at a filter medium for capture, enabling the removal of trapped errant particles from the physical area proximate to a sprayed or streamed target, improving the portability of a means for capturing unwanted matter, improving the spraying of paint or other particles directed towards a target, reducing labor required and risks attendant to the spraying or streaming of particles, preserving the integrity of a means for capturing errant particles by avoiding internally circulating suspended particles and instead maintaining the particles external to such means, and enhancing flexibility of manufacturing a means of trapping particles dispersed in air or gas insofar a a generally toroidal shape can be stamped, pressed, forged, blown from plastic foams, baked in a mould, and otherwise made by industrial or artisan means customarily known in the trade. These and other advantages of one or more aspects of the instant disclosure will be more readily apparent in light of the appurtenant drawing, representative illustrations and detailed description of the invented apparatus and process steps set forth in detail.

DRAWINGS

Figures

Brief Description of the Drawings

FIG. 1 shows an approximately forty-five degree frontal aspect view of one embodiment of a toroidal pneumatic trap for collecting suspended particles dispersed in air or gas where the particles are being directed by a human being through the toroid's hole at a target, which in the depicted instance is the wheel of an automobile situated behind the trap, and resulting in stray particles shown as arrows drawn toward the filter medium.

FIG. 2 shows an approximately forty-five degree overhead aspect view of one embodiment of a toroidal pneumatic trap for collecting suspended particles dispersed in air or gas where the filter medium has been withdrawn from the toroid's hole to reveal a blower positioned within the toroidal encasement.

FIG. 3 shows an approximately forty-five degree overhead aspect view of one embodiment of a toroidal pneumatic trap for collecting suspended particles dispersed in air or gas where the filter medium has been emplaced within the toroid's hole so that collection of the suspended particles may begin.

FIG. 4 shows a frontal cutaway view of one embodiment of a toroidal pneumatic trap for collecting suspended particles dispersed in air or gas where a plurality of blowers develop differential gas pressure and drive external gas through a filter medium and thereafter through an intake aperture to the inside of the toroid's encasement, around internal baffles and through an exhaust aperture, with power to drive the blowers contributed by an energy line alternatively providing electrical potential or pneumatic pressure.

DRAWINGS: REFERENCE NUMERALS

1 human being
2 spray gun
3 desired particle spray
4 particle ricochet and otherwise stray suspended particles
10 automobile tire
11 automobile wheel
16 on/off button
17 reset button
20 toroidal encasement
21 encasement internal space
23 hole
26 wire matrix
29*a-b* mobility handle
30 energy line
40 filter medium
50*a-b* magnet
70*a-f* baffle
100*a-g* intake aperture
200*a-g* intake blower
300*a-b* exhaust aperture
400*a-b* exhaust blower
500 intake gas current
600 exhaust gas current

DETAILED DESCRIPTION OF THE EMBODIMENTS

Construction: FIGS. 1, 2, 3, and 4.

A preferred embodiment is illustrated in FIG. 1 frontal aspect view depicting the toroidal pneumatic trap for collecting suspended particles dispersed in air or gas where the particles are being directed by human being 1 who is releasing paint from paint spray gun 2, although an air brush often substitutes for spray gun 2, into the void that is the toroid's hole 23. FIG. 1 shows toroidal encasement 20 aligned with an automobile wheel 11 and automobile tire 10 nearly perfectly insofar as the axis of hole 23 continues through the center of the wheel's spindle, not shown, although it is to be understood such perfect alignment need not sustain for the invention to obtain. The spray paint target, in this instance automobile wheel 11 intended to be selectively painted, need not perfectly scale in size relative to the invention nor be perfectly matched in geometric shape. Toroidal encasement 20 is depicted in FIG. 1 as having been placed into position near automobile tire 10 by human being 1 utilizing a mobility handle 29*b*, however, the actual vehicle that automobile tire 10 pertains to, which is not shown, could have readily been driven to its position near a stationary toroidal encasement 20 instead. The human being 1 is shown manipulating spray gun 2 in various directional movements such that desired particle spray 3, here paint and primer, will substantially contact selected various surface areas of automobile wheel 11 only. It can be seen how some of the desired particle spray 3 intended by human being 1 to contact select areas of automobile wheel 11 is tending movement towards areas that are undesirable and potentially damaging in the form of particle ricochet and otherwise stray suspended particles 4, here excess paint, suspended in air or gas currents which, if a blower, not shown this figure, is operating properly said particles will vector shift their movements in directions toward filter medium 40. The blower, which is shown in the accompanying drawings, is powered through energy line 30 and activated by on/off button 16 and, if required due to a power interruption, electrical or compressor surge, or other exigency, by reset button 17. Specifically with this embodiment, human being 1 has placed toroidal encasement 20 adjacent a target automobile wheel 11 for spray painting, activated a blower enclosed within toroidal encasement 20, and directed desired particle spray 3 comprising suspended particles dispersed in atmosphere through hole 23 of the toroidal encasement 20 toward the target with the result that any paint ricochet or stray paint particles move suspended within air or gas currents that flow through filter medium 40 and thereby deposit on or within the filter medium leaving gas currents to continue into the encasement internal space, which is shown in the accompanying drawings. Thus paint particles suspended in air or gas are collected by filter medium 40 of the pneumatic trap apparatus shown the embodiment in FIG. 1.

It being understood that a robot or other automation can substitute for human being 1 without the embodiment departing from the scope of the invention. Likewise, toroidal encasement 20 need not be a perfect toroid and the embodiment thus far described in connection with FIG. 1 does exhibit a planar, or flat, bottom surface to help stabilize toroidal encasement 20 in its optimal operating position. Although toroidal encasement 20 must possess encasement internal space which admits gas and allows gas to exit out from the interior volume of the toroidal encasement, as shown by the accompanying drawings FIG. 4, the toroidal encasement need not be perfectly rigid nor perfectly elastic or flexible provided the encasement internal space 21 sustains during operation of the trap. Accordingly, no specific circumference, height or width or other physical dimension of toroidal encasement 20 is required by the invention, although as shown in FIG. 1 the physical dimensions of the embodiment depicted correspond in terms of human scale approximately to automobile tire 10 while seating automobile wheel 11 during spray painting activities or, more particularly, to the maximum directional dimensions as measurable repeatably by a handheld tape, beginning with diameter, 28 inches×20 inches×5½ inches taken at the toroidal encasement's maximum circumference distal to hole 23.

Figure 1:
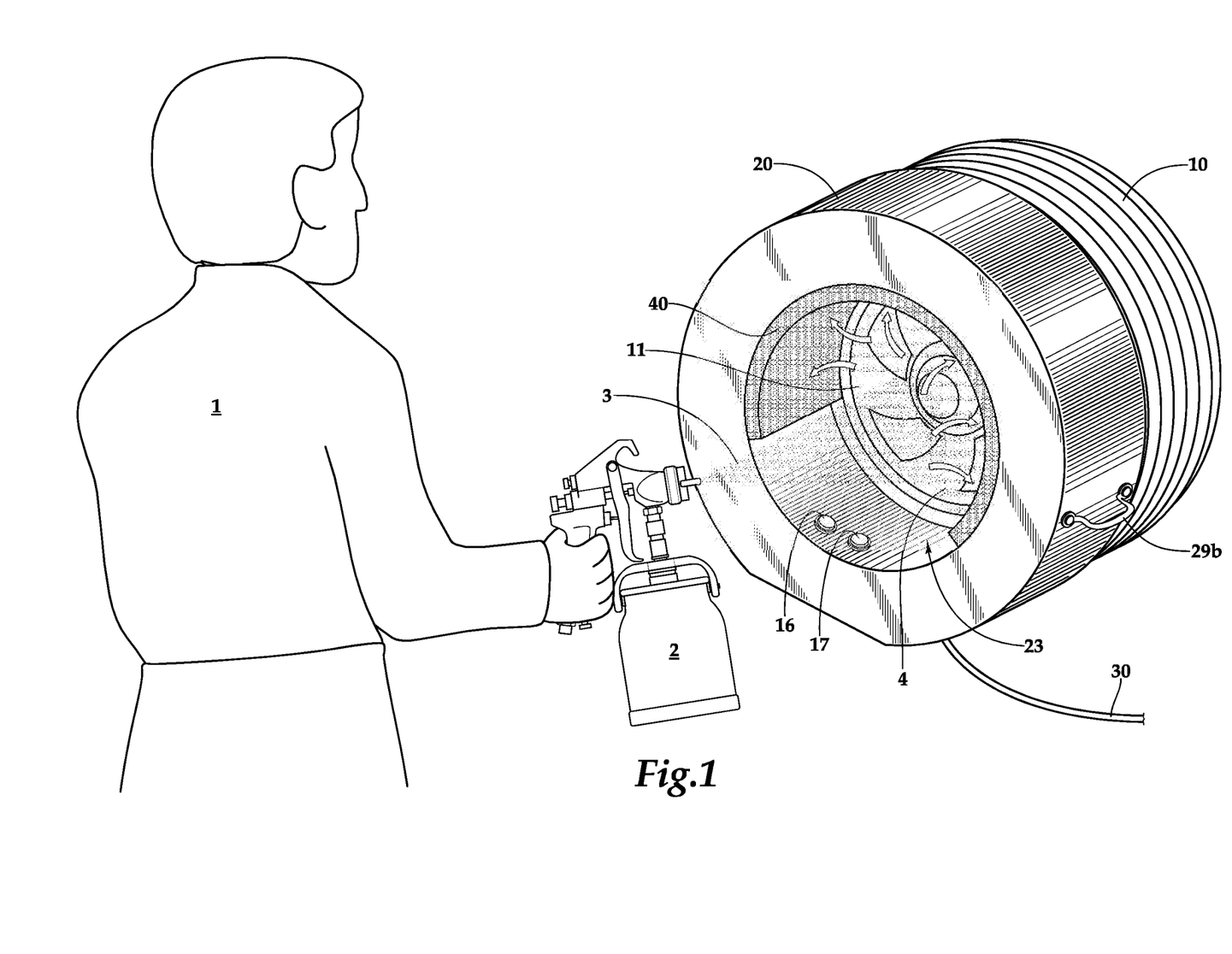

The embodiment set forth in FIG. 1 depicts toroidal encasement 20 constructed of sheet steel onto which is secured mobility handle 29b made of extruded steel that has been formed to a hand-holdable shape by means customary in the industry. Toroidal encasement 20 may or it may not be mobile depending upon specific application, however, the embodiment here does show mobility handle 29b as it can be be utilized to shift or otherwise move toroidal encasement 20 as human being 1 desires. It further being readily apprehendable that practically any industrial or other technological means for directing particles at a target, such as streaming, spraying, ejecting, pulsing, sputtering, vibrating, dusting, brushing, or ionizing particles may substitute for spray gun 2 without departing from the scope of the appended claims. Likewise, filter medium 40 is also enabled to manifest in the form of a tube, cylinder or other shape rather than the precise shape that is illustrated in FIG. 1 provided filter medium 40 permits an air or gas current to flow in a manner by which suspended particles deposit on or within filter medium 40. Filter medium 40 can be made, shaped or manipulated to establish, create, direct, or shape specific geometries air or gas current flows or particle trapping patterns. It is intended that filter medium 40 be removable for cleaning or replacement purposes. In addition, filter medium 40 can employ electrically charged or chemically active elements to alternatively attract or repel particles as generally understood in the physical sciences. A representative filter medium 40 as depicted in FIG. 1 is comprised of nonwoven polymer fibrous filaments but the filter medium may instead be comprised of woven glass spicules, cellulosic fibers or other materials tailored to address specific field requirements desired by the stakeholders or customers in terms of entrapping or otherwise capturing particles dispersed in gas.

Figure 2:
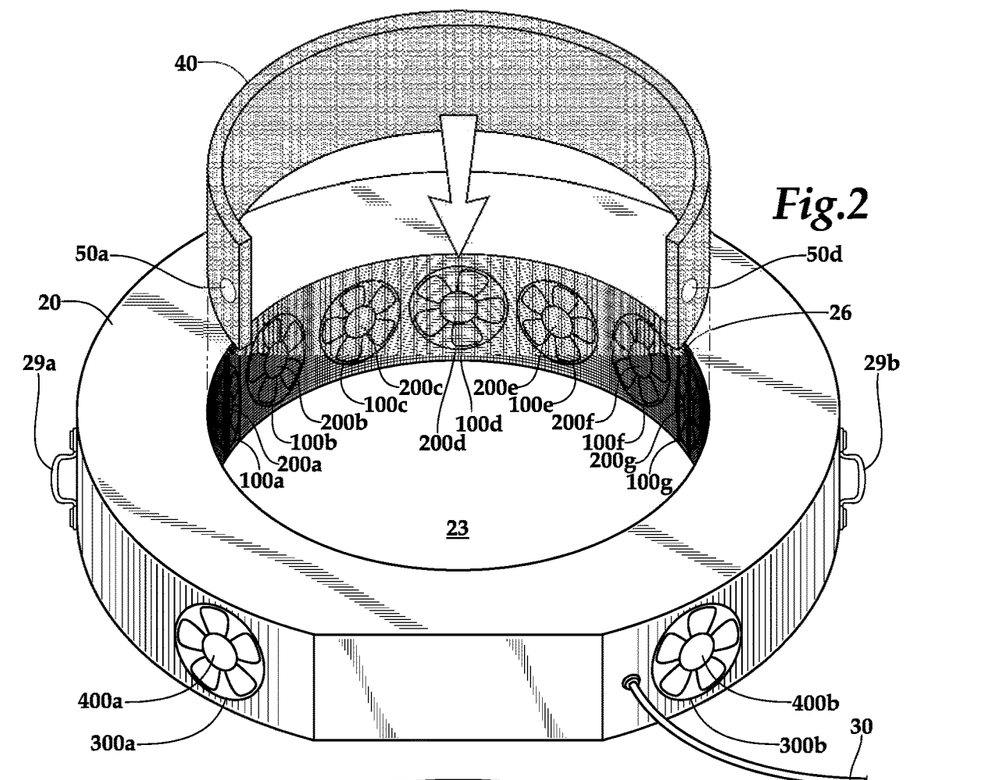

An embodiment is illustrated in FIG. 2 from its overhead, tilted perspective evidencing a toroidal pneumatic trap for collecting suspended particles dispersed in air or gas prior to removable filter medium 40 being installed inside hole 23, and revealing a plurality of intake blowers, specifically seven in number and denoted intake blower 200a, intake blower 200b, intake blower 200c, intake blower 200d, intake blower 200e, intake blower 200f, intake blower 200g, all positioned within toroidal encasement 20. Each of these seven intake blowers, 200a-g, corresponds to a single intake aperture which permits some gas or gasses to enter the intake blowers proximate to wire matrix 26. Thus in the instant embodiment the intake apertures enable gas currents to establish flow between hole 23 and the seven intake blowers 200a-g through the seven intake apertures respectively labeled 100a, 100b, 100c, 100d, 100e, 100f, 100g in FIG. 2. Results achieved include gas currents developing inside or otherwise visibly proximate to hole 23, flowing through or past wire matrix 26, entering: intake aperture 100a, intake aperture 100b, intake aperture 100c, intake aperture 100d, intake aperture 100e, intake aperture 100f, and intake aperture 100g; and, entering: intake blower 200a, intake blower 200b, intake blower 200c, intake blower 200d, intake blower 200e, intake blower 200f, and intake blower 200g. In this embodiment filter medium 40 is interposed between wire matrix 26 and the majority volume of hole 23. Filter medium 40 is shown in FIG. 2 enabled for attachment to wire matrix 26 by magnet 50a and magnet 50d. An alternative embodiment provides filter medium 40 enabled for attachment by a magnet, clip, or by hook and loop material, inside hole 23 directly to toroidal encasement 20 constructed of ferrous alloy thus avoiding wire matrix 26. Magnet 50a and magnet 50d are intended to be removed together with filter medium 40 for cleaning or replacement once numerous particles are trapped on the filter medium, thus magnet 50a and magnet 50b are commonly constructed from inexpensive magnetized materials, for example, such as Magnetic! Magnetic Squares, 1 tape sheet of 70 magnetic squares, each 20×20×2 mm, with magnet on one side and self-adhesive on the distal side, model number C-SD, ASIN identity B01LWOIMJN, manufactured by Blueshift US. Wire matrix 26 contains ferrous material, however, it is apparent how a clip, bracket, snap, or hook and and loop material such as VELCRO can readily substitute for magnet 50a and magnet 50b with this embodiment described in FIG. 2. Holding efficacy, availability, environmental, and cost concerns typically help determine which fastening means will secure filter medium 40 proximate to an intake aperture and, further, some embodiments enable the filter medium to repose securely in place without a fastening means, for example, the filter medium may be manufactured with inherent rigidity allowing it to merely fit tightly within hole 23.

FIG. 2 further discloses exhaust aperture 300a and exhaust aperture 300b, each of which permits air or gas to flow from within encasement internal space 21 and vent exterior to encasement internal space and directionally away from hole 23. An effect achieved is that air or gas departs the the volume of space proximate to hole 23 and does not interfere with particles being directed at a target through the hole, moreover, this air or gas can be harnessed to contribute additional useful work given the respective positioning of exhaust aperture 300a and exhaust aperture 300b by driving exterior current flows in vicinity of toroidal encasement 20 thus blowing dust or other debris away from the toroidal encasement or the target area. In this embodiment, exhaust aperture 300a is accompanied by exhaust blower 400a and exhaust blower 300b is accompanied by exhaust blower 400b. An exhaust blower as shown improves air or gas flows and the properties of these flows within encasement internal space 21 and drives them outside. Although FIG. 2 shows an embodiment having seven intake apertures, seven intake blowers, two exhaust apertures, and two exhaust blowers, it is readily apprehendable how the number or combination of some aperture and blower elements can be varied, omitted, or supplemented in other, different embodiments without departing from the scope of the invention. In the embodiment depicted, intake blower 200a-g and exhaust blower 400a-b are electrically powered motorized fans commercially available at the time of this application such as the GDSTIME 80 mm×80 mm×25 mm 12 volt 0.2 amp brushless DC current fan—although AC power current is utilized with the blower in a different embodiment—rotating its fan blades at 2,000 RPM and weighing 60 grams each. FIG. 2 also shows energy line 30 in the form of a thermoplastic clad copper wire electrical power cord for actively powering a blower. Although a blower must be actively powered, it can have myriad physical forms and attributes adapted to or optimized for particular applications without departing from the scope of the invention provided air or gas enters hole 23, interfaces with filter medium 40 by depositing particles suspended within a volume of said air or gas on filter medium 40, enters encasement internal space 21, and vents outside toroidal encasement 20 by full or partial contribution of such blower. Thus a blower may be powered by electricity of either alternating or direct current, compressed gas or gases supplied by a compressor or storage tank internal or external to toroidal encasement 20 in whole or in part, pressurized liquid, or other energizing means suited to the application.

Figure 3:
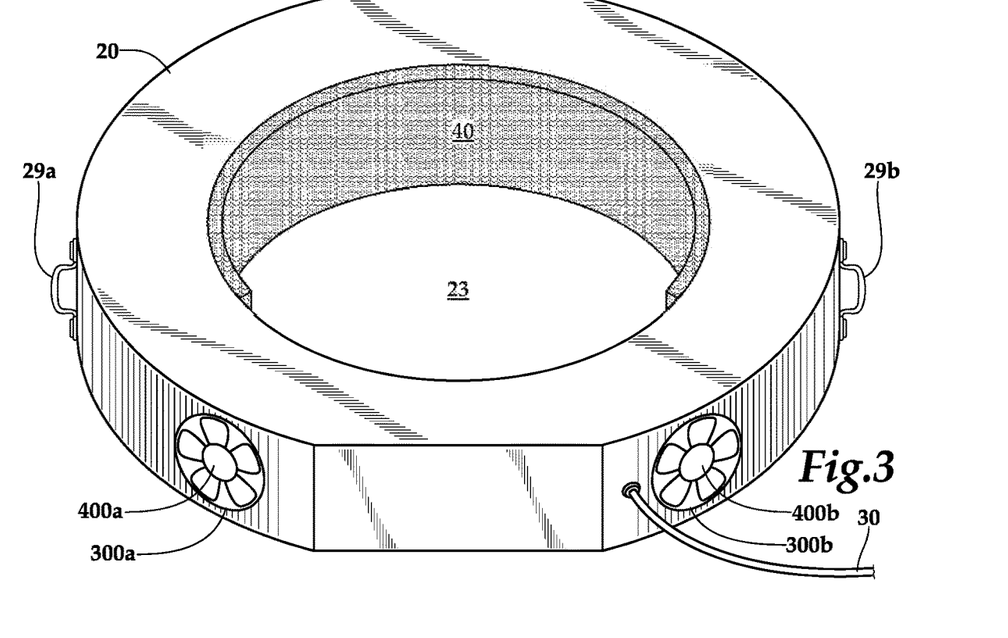

Relating FIG. 1 with FIG. 2, it can be seen how embodiments of the invention are employed to trap stray or otherwise errant particles in the course of a human being spray painting a wheel that is seated within a tire which is connected to an automobile. Already human being 1 has grabbed mobility handle 29b and perhaps mobility handle 29a and then moved toroidal encasement 20 adjacent target automobile wheel 11 with the intention of utilizing spray gun 2, if desired in conjunction with some other directing means such as an air brush, to direct a desired particle spray 3 of paint at automobile wheel 11 without depositing paint on automobile tire 10 or elsewhere paint is undesireable. Toroidal encasement 20 has been fitted within a wheel well of an automobile as referenced, although not shown by FIG. 1 or FIG. 2, and the toroidal encasement abuts or nearly contacts automobile tire 10 despite the invention need not repose within a wheel well or contact a target or its accompanying structure. Human being 1 has depressed on/off button 16 causing activation of at least one blower enclosed with toroidal encasement 20. Energy line 30 may not appear in all embodiments, for example, a given embodiment may substitute for energy line 30 with an electrical battery, fuel cell, gas storage tank or other local power source physically secured onto or situated within toroidal encasement 20. Depressed on/off button 16 has established an electrical potential through a motorized blower and the blower has developed a gas pressure differential as a consequence of its functioning. Gas currents, in this instance air from the Earth's atmosphere, have developed in the proximity of toroidal encasement 20 according to its geometric attributes as a toroidal shape. Gravity, Coriolis force, electrostatic charge, humidity and other physical phenomenon act on the gas currents and any particles suspended by the gas currents. Spray gun 2 has been pressurized and its storage tank contains paint to be sprayed on select areas of automobile wheel 11 for a customer of human being 1 who will not compensate human being 1 for this artisan's time if paint inadvertently is deposited on automobile tire 10 or upon any other area of the customer's automobile. Human being 1 has depressed a trigger on spray gun 2 and has commenced manipulating spray gun 2 in various patterns in order to apply paint upon select areas of automobile wheel 11 in the form of desired particle spray 3. In this sense human being 1 has directed suspended particles through hole 23 of the encasement towards a target. Human being 1 has committed human error and spray gun 2, or another particle deposition means including an air brush, has failed to operate perfectly as designed thus causing paint particles suspended within the volume of the gas currents to migrate towards undesired areas of the automobile. In the absence of the instant invention, human being 1 without mitigation may not be compensated by the customer and may even be sued for damages caused by errant paint particle deposition. FIG. 1 depicts the embodiment as the invention pneumatically traps problematic paint particles at some point in time suspended proximate to hole 23 after being directed at target automobile wheel 11, here indicated as particle ricochet and otherwise stray suspended particles 4 of paint. Some undefined portion of desired particle spray 3 has become particle ricochet and otherwise stray suspended particles 4, depicted by arrows in FIG. 1. As the graphic arrows indicate, stray paint particles occupied volume within gas flows, then interfaced with and eventually were captured by filter medium 40, and subsequently the gas flowed through an intake aperture 100 without some stray paint particles. FIG. 3 shows filter medium 40 after particles were trapped successfully and still positioned in the invention over intake aperture 100a-g, wire matrix 26, intake blower 200a-g, and sustained in position by magnet 50a and magnet 50b. Gas flow has been driven by an intake blower 200 and it has entered encasement internal space 21 to flow inside toroidal encasement 20 and exit the same in the form of vented exhaust through an exhaust blower 400 and an exhaust aperture 300 to the exterior of toroidal encasement 20. Painting activities have concluded in FIG. 3 and, although the customer could have driven the automobile described away from the stationary invention apparatus under customary circumstances, instead here human being 1 has moved the toroidal encasement and other elements away from the automobile using mobility handle 29a and mobility handle 29b and subsequently laid the encasement down upon one side for access to discretionarily clean or replace filter medium 40. Since the toroidal encasement is described for this embodiment as having capability of insertion the wheel well of some automobiles prior to applying paint to wheel, human being 1 has concluded the process by moving the encasement a distance of at least one centimeter from the target wheel or automobile so that it is enabled to escape the wheel well and liberate the target, nonetheless, it is to be understood that not all embodiments may result in moving the encasement but rather the target is moved or in other embodiments when the encasement is, in fact, moved the actual distance moved can vary by any distance provided it is suited to the physical parameters of a given target scale and local environment. Further understood is the fact a target need not be an automobile wheel and thus various embodiments may be implemented for targets having materially different properties provided a target can receive a particle directed at it and the instant invention will obtain.

Figure 4:
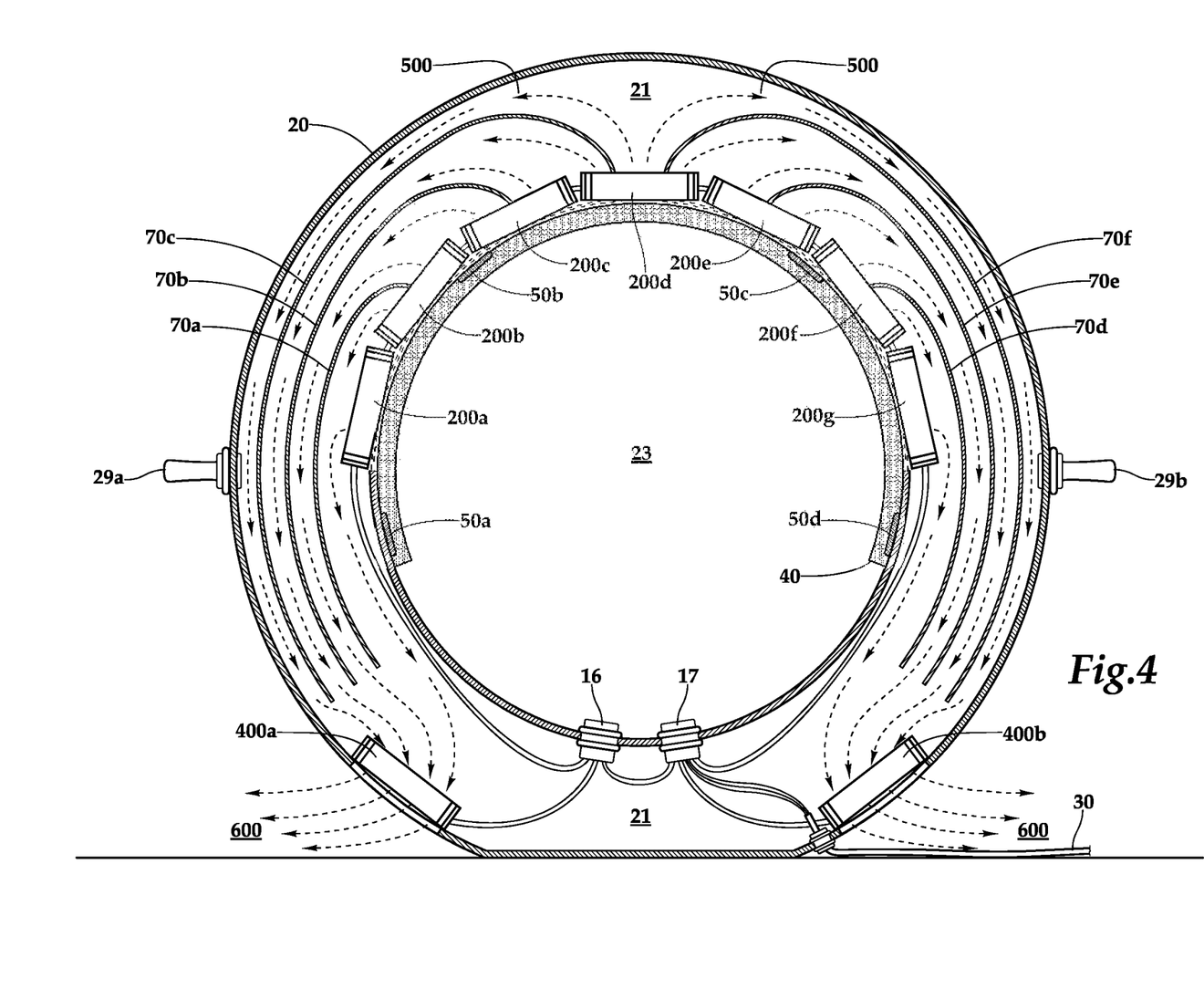

A derivative embodiment is illustrated in FIG. 4 from a frontal cutaway perspective whereby a plurality of blowers develops differential gas pressure pursuant to the physical laws across an internal baffle arrangement. In this embodiment, baffles 70a-f modify the flow of air or gas through encasement internal space 21 to improve desirable attributes of these flows over implementations with no internal baffles. It should be observed that baffles direct moving gas around potential impediments to contribute less disrupted gas flow inside encasement internal space 21, for example, it being generally understood that a blower and its associated structure as well as internal electronics, cables, fasteners and other physical objects inside toroidal encasement 20 can disrupt gas flow including laminar gas flow when gas driven at velocity encounters the object and local pressure differentials develop as a consequence. A baffle may be constructed of any material that is appropriate for the physical conditions inside toroidal encasement 20 and non-technical considerations may influence material selection, for example, forming a baffle from metal scrap obtaining from production of toroidal encasement 20. All baffles, if any baffles is actually present within a particular embodiment, can be made from an identical pattern or in certain embodiments each in a plurality of baffles can differ by their attributes, for example, parameters or aspects such as curvature, furrows, ridges, punched holes, slits, fins, wings, vortex generators, thickness, rigidity or flexibility can be absent, present, equivalent or different. In addition, a baffle 70 can channel moving gas from inside toroidal encasement 20 to the outside of encasement 20 or otherwise transport moving gas where desired to achieve effects desired.

Baffle 70a, baffle 70b, baffle 70c, baffle 70d, baffle 70e, baffle 70f and baffle 70g have been depicted in FIG. 4 as they are implemented to accept intake gas current 500 near one terminus of each respective baffle's surface area relative to the circumference of hole 23. From such terminus general location a flowing gas encounters physical conditions including pressure exerted by the presence of toroidal encasement 20 proximate to encasement internal space 21 and such baffle's surface and thus the flowing gas, here shown as intake gas current 500, travels towards an exhaust aperture 300 and vents as exhaust gas current 600. A blower, in the implementation of the instant embodiment there are two such blowers, exhaust blower 400a and exhaust blower 400b, each of which accepts gas currents moving within encasement internal space 21, drives gas to eventually exit the encasement to the outside realm. In the instant embodiment, not every blower has a corresponding baffle 70. Indeed, some embodiments do not have an exhaust blower 400 and some of these embodiments incorporate a baffle or plurality of baffles to contain gas from intake to exhaust.

The embodiment shown in FIG. 4 illustrates how atmospheric gas currents ideally carrying suspended particles dispersed in such currents do flow from inside hole 23 through gas permeable filter medium 40 depositing some formerly suspended particle, if any, onto filter medium 40 for entrapment thereby being cleaned of the particle with the gas current transiting through intake apertures 100a-g driven initially by intake blowers 200a-g in the continuous form of intake gas current 500 forced around baffles 70a-f to desired flow parameters including around various internal objects or constrictions inside encasement toroidal space 21 to a volume where exhaust blower 400a and exhaust blower 400b in the embodiment contributes gas movement external to toroidal encasement 20. Baffles, if present, may number only one or else a plurality. The toroidal encasement shape itself or in combination with at least one blower may eliminate a baffle or otherwise influence the number of baffles implemented depending on the intended application of an embodiment. FIG. 4 shows an embodiment having a rigid toroidal encasement 20 and rigid baffle 70a-f, nonetheless, other embodiments contemplated may employ a non-rigid toroidal encasement 20 and flexible baffle 70a-f without departing from the scope of the invention, for example, toroidal encasement 20 may be made of elastic material such as vinyl acetate and baffle 70a-f thermoplastic maintained in functional configuration by intake blower 200.

Advantages

As can be seen from the descriptions contained within this disclosure, some embodiments of the pneumatic trap for collecting suspended particles dispersed in air or gas have a number of advantages:

1. Labor Savings: An artisan or other worker directing a spray of particles at a target can concentrate on the task with reduced concern for particles depositing errantly. Such a person or the employer of such person avoids time-consuming or expensive clean up or replacement activities necessitated by accidental particle deposition. Masking tape, guides, paper shields and other means for preventing undesired painting and coating are obviated by embodiments of the invention. Labor otherwise spent quieting an displeased customer and addressing other negative consequences of problem particle deposits can be expended on new productive tasks instead thereby saving labor.

2. Efficiency Increases: With some embodiments of the present invention, a painter, applier of coatings or robot or other person or automation can more quickly commence air, gas and particle flow directed at a target thus speeding up project conclusion and redeploying to a new project. A disposable replaceable filter medium can avoid some clean up tasks because cleaning the filter medium is no longer required and thus the process of spraying or streaming particles becomes more efficient. Nor with the invention is routine cleaning of the apparatus' internal spaces required to sustain efficient air or gas flow.

3. Effectiveness Improvements: The configuration of the apparatus and process of using the invention can achieve delivery of particles where optimal even under adverse circumstances such as windy conditions, uneven roadside slopes, tight or cluttered industrial floor space, irregular geometries presented by the target, and static charges thus contributing novelty in respect of effectiveness. The generally toroidal shape of the invention suggests a circular bulls eye target with the toroid's hole serving as a guide where particles should be sprayed. Air and gas flow initiating proximate to and through the hole, continuing within the internal spaces of the generally toroidal encasement, and subsequently exhausting away from the hole where exhaust gasses otherwise could interfere with spraying and streaming activities enables effective capture of stray particles while optimizing particle flow in technically and economically productive directions and forces.

4. Flexible Power Sources: Various embodiments and process steps are enabled to benefit from whatever optimal power source can be applied to drive a blower or plurality of blowers thus developing gas or gas mixture flow as described in the paragraph above and obtaining the novel results of the invention. One embodiment for roadside utilization can power a blower with electricity because the blower has an electrical motor and possibly an AC/DC power convertor; a separate embodiment for roadside use can instead draw power from an air compressor that drives a handheld paint spray gun via a splitter on the main line with one split air line running to the spray gun and a second split air line running to the embodiment's constituent elements for driving a blower; and in addition, an embodiment for maritime robotic use whereby a blower or a plurality of blowers are driven by sea water, fresh water, distilled water, hydraulic fluid or some other feasible liquid pumped under pressure thus enabling stray particle capture in conjunction with a locally-optimal power source.

5. Portability/Mobility: The present invention scales in size with various embodiments possible depending upon the application intended and without departing from the scope of the disclosure. Handheld or smaller embodiments can be employed inside machinery or connected to robotic automation and sprayers by way of example, and other larger embodiments such as those intended for painting the wheels of Caterpillar 797F trucks, which have a 400 ton payload capacity, can be produced without departure from the scope. A preferred embodiment can be transported by a single human being, who is enabled to grasp one or a plurality of handles to position the invention adjacent an automobile tire and wheel roadside for touch up painting work. Of course embodiments of the invention can be fixed in place and the target of sprayed or streamed particles brought into physical proximity with the invention instead.

CONCLUSION, RAMIFICATION AND SCOPE

Accordingly, it can be appreciated by the reader that the pneumatic trap for collecting suspended particles dispersed in air or gas can be produced in various embodiments by which the capture of stray particles is desirable. It can also be appreciated that gas flow created proximate to the hole in a toroidal encasement confers new, nonobvious and distinct benefits in the form of physical gas and particle behavior as outside gas enters the internal space inside the toroid and subsequently flows through the encasement to exhaust exterior to the encasement at a location where the exhaust gas does not interfere with spraying and/or streaming activities directed towards the hole.

Currents of gas and particulate intended to be directed through the toroid's hole at a target are enabled to be protected from negative influences including misdirection by conditions such as wind and contamination by dust insofar as the toroidal encasement can provide a physical barrier substantially shielding an aspect of the target area. Once a blower has been activated those currents will be established and shaped by the generally toroidal aspect of the invention in form desirable and optimal for depositing particles on target as required by technical parameters while concurrently capturing and trapping stray particles on a filter advantageously from a technical and/or business viewpoint.

The embodiments illustrated in this invention are in no way restricted to changes and modification that may be made without departing from the scope of the invention. Although the drawings and detailed descriptions contained within the disclosure attempt much specificity, those should not be construed as limiting the scope of the embodiments but as merely providing illustration of some of the embodiments. For example, a plurality of blowers has been mentioned, and an embodiment produced for coating the wheels of massive Caterpillar 797F trucks may incorporate multiple blowers and many baffles to drive gas and particulate flows. Contra, a single blower may be utilized to drive gas and particulate flows on a very small scale by comparison with a human being if the invention is fabricated at the nanoscale level. Thus the scope of the embodiment should be determined by the appended claims and the legal equivalents rather than the examples given.

What is claimed is:

1. A pneumatic trap for collecting stray particles dispersed in gas during spraying operations wherein a flow of particles can be directed at a target that is positioned adjacent the reverse side of the hole of a toroidal encasement and further comprising said hole enabled to admit gas and particles to be projected through said hole at said target when said target is positioned adjacent said reverse side of the hole of said toroidal encasement;

said toroidal encasement having an internal chamber through which gas is enabled to be admitted, circulated, and vented;

a filter medium mounted inside said hole of said toroidal encasement, said filter medium positioned exterior to said internal chamber of said toroidal encasement;

said filter medium enabled to trap said stray particles exterior to said internal chamber of said toroidal encasement, said filter medium enabled to admit gas into said internal chamber;

an intake aperture located adjacent said filter medium enabled to admit said gas into said internal chamber of said toroidal encasement;

an intake blower enabled to generate a flow of said stray particles dispersed in said gas, said intake blower enabled to draw said stray particles onto said filter medium thereby enabling said stray particles to be trapped by said filter medium, said gas enabled to flow through said filter medium into said internal chamber;

an exhaust blower enabling the driving of said gas to vent from said internal chamber to the exterior of said toroidal encasement; and an exhaust aperture adjacent said exhaust blower enabling said gas to exit said internal chamber and flow exterior to said toroidal encasement.

2. A pneumatic trap according to claim 1 having a baffle which directs the flow of gas through said internal chamber.

3. A pneumatic trap for collecting stray particles dispersed in gas during spraying operations wherein a flow of particles can be directed at a target that is positioned adjacent the reverse side of the hole of a toroidal encasement and further comprising said hole enabled to admit gas and particles to be projected through said hole at said target when said target is positioned adjacent said reverse side of the hole of said toroidal encasement;

said toroidal encasement having an internal chamber through which gas is enabled to be admitted, circulated, and vented;

a filter medium mounted inside said hole of said toroidal encasement, said filter medium positioned exterior to said internal chamber of said toroidal encasement;

said filter medium enabled to trap said stray particles exterior to said internal chamber of said toroidal encasement, said filter medium enabled to admit gas into said internal chamber;

an intake aperture located adjacent said filter medium enabled to admit said gas into said internal chamber of said toroidal encasement;

an intake blower enabled to generate a flow of said stray particles dispersed in said gas, said intake blower enabled to draw said stray particles onto said filter medium thereby enabling said stray particles to be trapped by said filter medium, said gas enabled to flow through said filter medium into said internal chamber; and an exhaust aperture enabling said gas to exit said internal chamber and flow exterior to said toroidal encasement.

4. A pneumatic trap according to claim 3 having a baffle which directs the flow of gas through said internal chamber.

5. A method for collecting stray particles dispersed in gas during spraying operations which comprises the steps placing a filter medium inside a hole of a toroidal encasement;

activating a blower internal to said toroidal encasement;

directing a plurality of particles through said hole at a target located on the opposite side of said hole; and trapping a stray particle of said plurality of particles on said filter medium exterior to an internal chamber of said toroidal encasement.

* * * * *